United States Patent [19]

Fenton

[11] Patent Number: 4,807,039
[45] Date of Patent: Feb. 21, 1989

[54] MOTION PICTURE FILM TRANSPORT

[75] Inventor: Roger W. Fenton, Chelmsford, United Kingdom

[73] Assignee: The Marconi Company Limited, Stanmore, England

[21] Appl. No.: 52,332

[22] Filed: May 21, 1987

[30] Foreign Application Priority Data

Mar. 25, 1987 [GB] United Kingdom ................. 8707126

[51] Int. Cl.⁴ .............................................. H04N 5/253
[52] U.S. Cl. ...................................... 358/214; 352/26; 352/27
[58] Field of Search ..................... 358/214; 352/26, 29, 352/28, 31, 12, 27

[56] References Cited

U.S. PATENT DOCUMENTS

| | | | |
|---|---|---|---|
| 3,582,196 | 6/1971 | Colodner | 352/24 |
| 3,620,609 | 11/1971 | John, Jr. | 352/17 |
| 3,952,328 | 4/1976 | Biber | 358/54 |
| 4,032,224 | 6/1977 | Wray | 352/26 |
| 4,084,891 | 4/1978 | Kiefer | 352/22 |
| 4,088,399 | 5/1978 | Millward et al. | . |
| 4,205,337 | 5/1980 | Millward | 358/54 |

Primary Examiner—Robert Lev
Attorney, Agent, or Firm—Spencer & Frank

[57] ABSTRACT

Motion picture film transport of the kind used in a telecine apparatus uses a common film lacing path between a picture gate and a sound gate for films of different gauges. An audio delay circuit delays the audio signal generated at the sound gate for at least one of the film gauges to maintain synchronism between the audio and video output signals.

6 Claims, 1 Drawing Sheet

MOTION PICTURE FILM TRANSPORT

BACKGROUND OF THE INVENTION

This invention relates to multi gauge motion picture film transports as used, for example, in telecine apparatus.

Multi gauge film transports provide the advantage of compactness and economy when compared to equivalent multiple transport arrangements in which a different transport mechanism is provided for each different gauge of film. Well known means can be used to provision multi gauge film guidance rollers and interchangeable gate/lens assemblies. These means readily accommodate the different film stock widths, for example 16 and 35 mm film gauges and the differing picture frame sizes of these gauges. More difficult to accommodate is the differing sound to picture displacements or offsets employed by the different film gauges. Taking, for example, the "optical" sound heads for 16 mm and 35 mm gauges, the former has 26 frames offset equal to 198 mm whilst the latter has 21 frames offset equal to 399 mm. The difference between these offset values is accommodated by provisioning different lacing paths between the picture scanning and sound reading heads for each of the film gauges to be handled. Such a solution can lead not only to comprising the guidance system of the film to the sound drum but also to confusion for the operator in that each film gauge is laced differently.

SUMMARY OF THE INVENTION

According to this invention a motion picture film transport includes means for passing a film between a sound gate and a picture gate, the sound gate being capable of handling films of at least two different gauges and the films of different gauges being arranged to follow a common lacing path between the two gates; and delay means for delaying an audio signal generated at the sound gate and which is associated with at least one of the film gauges so that the audio signal is made available in synchronism with a video signal generated at the picture gate.

The term sound gate is defined as the location of the sound heads. These heads are at slightly different positions depending on the film gauge and whether they are magnetic sound heads or optical sound heads. The picture gate may be capable of handling just a single film gauge and if so it is of an interchangeable nature so that the appropriate picture gate is chosen which is compatible with the film gauge being used.

The invention is intended for use with a telecine apparatus in which a video signal is derived from a motion picture film so that it can be broadcast as a television signal, or merely displayed on a local television type monitor. When a sound track is associated with the picture, it is very important that the audio signal is made available in synchronisation with the video signal, and this can be difficult to achieve since it requires an exact spacing between the sound and picture gates, and hence the lacing path between the two gates must be precise and unvarying for a given film gauge. For a telecine apparatus which is able to handle films of different gauges this presents even greater problems which the present invention avoids.

BRIEF DESCRIPTION OF THE DRAWINGS

The present invention is further described by way of example in which.

DESCRIPTION OF THE PREFERRED EMBODIMENTS

Figure 1:
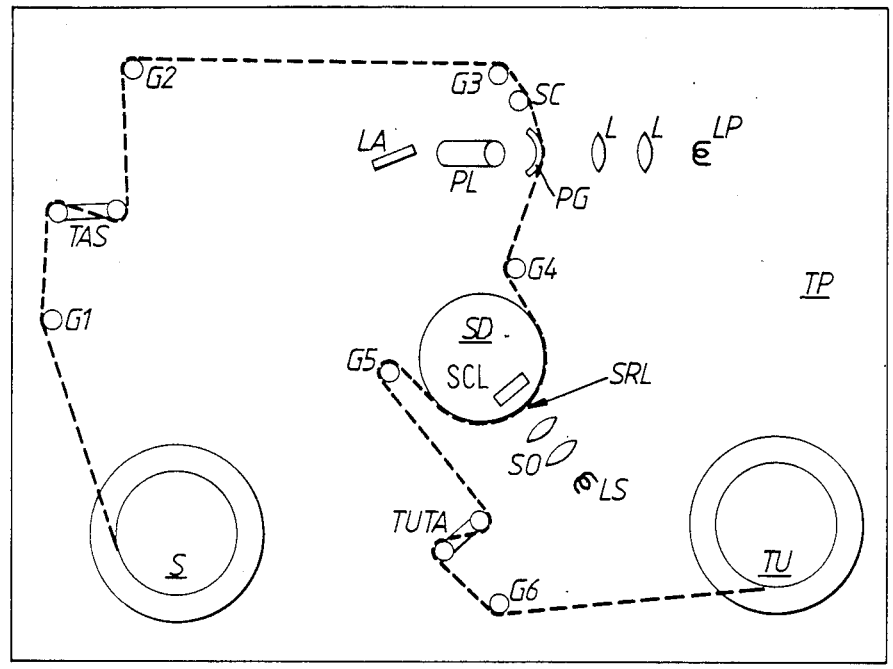
FIG. 1 is a schematic diagram of the lacing path of a telecine in accordance with the invention.

Referring to FIG. 1, there is illustrated therein the film transport arrangement; in this example a continuous motion transport with a charged coupled device (ccd) line array picture scanning arrangement is shown. It will be appreciated that other picture scanning arrangements may be employed, for example flying spot, and that also the transport need not be of the continuous motion kind as the invention can be beneficially applied to intermittent motion transports. In this example only one picture imaging device is shown for simplicity, but it will, however, be appreciated that further devices together with colour separation optics can be employed to provide colour pictures.

The film to be displayed is loaded at a supply reel position S, and is taken via a guidance roller G1 and on to a tension arm TAS which regulates the supply film tension by way of control of the supply reel motor, not shown.

The film then passes via two guide rollers G2 and G3 and sprocket counter SC to the picture gate PG where the picture frame of the film is illuminated by a lamp LP and lens system L. The picture gate PG is interchangeable to suit the film gauge being used. Light passing through the film is collected by the projection lens PL which images a horizontal slice of the picture frame onto the ccd line array LA.

On leaving the picture gate PG the film is in a well established lateral position having been biased within the picture gate to its reference edge. On arrival at the sound drum SD via guide roller G4 this established lateral position is maintained. The film on progressing around the sound drum retains this well established lateral position at the sound reading location SRL. In this example the sound drum SD is a driven member serving also the purpose of a capstan to drive the film through the transport.

At the sound reading location SRL conventional means are provided to read the optical sound track of the film. In this example, one system is shown comprising a sound lamp LS and sound optic SO to image a slit of light onto the film. The light passing through the sound track area of the film is collected by a sound cell SCL which is conveniently affixed to the transport plate TP. Second or further sound optics and sound cells can be similarly arranged to image the optical sound tracks of other gauges of film. Further sound lamps may be employed, although generally means can be provided to guide the light from one sound lamp to two or more sound optics as is well known to those in the art.

The film on leaving the sound drum SD passes via a further guide roller G5 to a take up tension arm TUTA and then via a further guide roller G6 to the film take up reel TU. The take up tension arm is arranged to control the film tension at the take up reel by control of a take up motor not shown.

Considering in more detail the span of film between the picture gate PG and the sound drum SD and, more particularly, to the span from the picture gate PG to the sound gate at the sound reading location SRL, conventionally this span would be arranged to precisely match the picture to sound offset distance of the film gauge in use. Indeed, conventionally, when a different gauge of film is to be used this span distance has to be varied, necessitating a different lacing path for different film gauges. In the present invention the same or similar span is used for all gauges of film, conditional only in that the shortest picture to sound offset distance of the films to be used is either matched or undercut. In this way sound at the sound gate will be read in advance of the picture and may then be electronically delayed by known techniques to achieve proper picture to sound synchronisation at the video and audio output connections of the apparatus.

Figure 2:
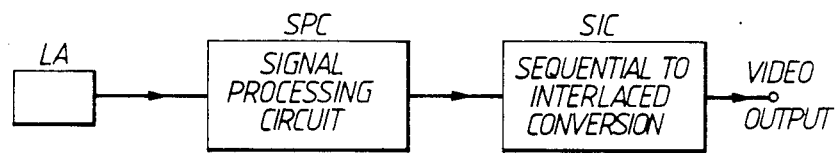
FIG. 2 shows part of the electrical system associated with the video and audio signals.
Figure 2:
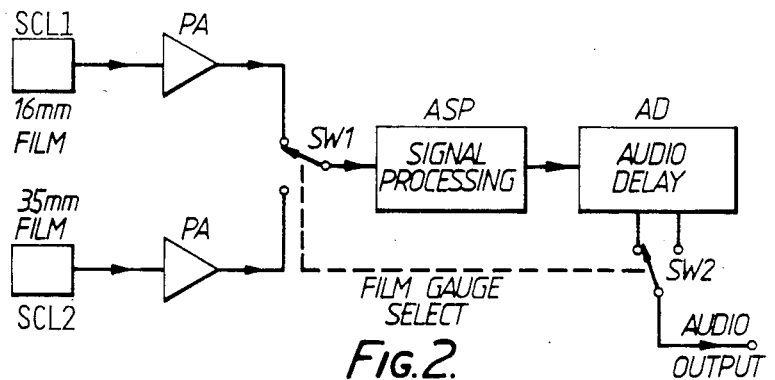

FIG. 2 illustrates in block diagramatical form the signal handling system.

The optical picture image which is projected upon the ccd line array optical sensor LA gives rise to a video signal which is fed via a signal processing circuit SPC to a converter SIC which converts the sequential signal to an interlaced signal to provide, as is well known, standard broadcast video signals.

In this example each gauge of film, 16 mm and 35 mm, is associated with its own sound cell SCL and these are placed in very close proximity to each other within the sound drum SD. Because of the need to physically locate them, they may be displaced from each other around the circumference of the sound drum, so that the actual distance between each sound cell SCL and the picture gate PG may be slightly different even though the intervening lacing paths are the same.

The two sound cells SCL1 and SCL2 generate audio signals in response to the fluctuating light signals caused by the optical sound track of the films, and the audio signals are fed via pre-amplifiers PA and a switch SWI to an audio signal processing circuit ASP. Of course, at any one time only one of the sound cells will be generating an output, and the switch SW1 is set in dependence on the gauge of film being used. The processed audio signal is routed through an audio delay circuit AD, having a selectable output which imparts the required delay to the audio signal so that it is output in synchronism with the video signal to which it relates. Although in this example the delay is determined by the tap point selected by a switch SW2, the sound delay can take other forms. For example it could be a digital storage based system in which clock rates could be altered to give a required delay time. If the lacing distance between the picture (video) gate and the sound gate is so chosen, then the delay associated with one film gauge could be zero.

If the film speed is varied, then a consequential adjustment to the sound delay is required in order to maintain synchronism with the video signal. It may be advantageous not to make one of the selectable delay times zero, so that it can be reduced if necessary. The order in which the stages are arranged is not important and may be left to the preference of the individual designer.

It will be appreciated that switch selection will be required, as shown, to choose the sound source in use and also at the same time to select the required value of sound delay to ensure proper picture to sound synchronisation at the video and audio output connections.

The invention is not limited to optical sound reading, it may equally encompass the reading of magnetic sound tracks where the freedom to site the magnetic sound heads for the advanced reading of the sound track may be beneficially employed in aiding most optimum transport designs.

I claim:

1. A motion picture film transport comprising means for passing a film between a sound gate and a picture gate, both said gates being capable of handling films of at least two different gauges and the films of different gauges being arranged to follow a common lacing path between the two gates; and delay means for selectably delaying an audio signal generated at the sound gate and which delays the audio signal by a selected amount for each film gauge so that the audio signal is made available in synchronism with a video signal generated at the picture gate.

2. A transport as claimed in claim 1 wherein said transport forms part of a telecine apparatus.

3. A transport as claimed in claim 1 wherein said transport being a continuous motion kind, and said picture gate includes a line array optical sensor.

4. A transport as claimed in claim 1 wherein said delay means being provided to delay an audio signal being associated with each said gauge of film.

5. A transport as claimed in claim 1 wherein said delay provided by the delay means being adjustable to accommodate variations in film speed through the transport.

6. A transport as claimed in claim 1 wherein said delay is zero for one of said film gauges.

* * * * *